(12) United States Patent
Howard (10) Patent No.: US 10,216,692 B2
(45) Date of Patent: Feb. 26, 2019

(54) MULTI-CORE PARALLEL PROCESSING SYSTEM

(75) Inventor: Kevin D. Howard, Tempe, AZ (US)

(73) Assignee: Massively Parallel Technologies, Inc., Boulder, CO (US)

(*) Notice: Subject to any disclaimer, the term of this patent is extended or adjusted under 35 U.S.C. 154(b) by 1070 days.

(21) Appl. No.: 12/817,839

(22) Filed: Jun. 17, 2010

(65) Prior Publication Data
US 2010/0325388 A1 Dec. 23, 2010

Related U.S. Application Data

(60) Provisional application No. 61/187,999, filed on Jun. 17, 2009.

(51) Int. Cl.
*G06F 15/173* (2006.01)
*G06F 12/0842* (2016.01)

(52) U.S. Cl.
CPC .... *G06F 15/17375* (2013.01); *G06F 12/0842* (2013.01)

(58) Field of Classification Search
CPC .................................................. G06F 12/0842
See application file for complete search history.

(56) References Cited

U.S. PATENT DOCUMENTS

| | | |
|---|---|---|
| 5,166,674 A | 11/1992 | Baum et al. |
| 5,224,100 A | 6/1993 | Lee et al. |
| 5,325,526 A | 6/1994 | Pierce et al. |
| 5,349,682 A | 9/1994 | Rosenberry |
| 5,371,852 A | 12/1994 | Attanasio et al. |
| 5,488,609 A | 1/1996 | Hluchyj et al. |
| 5,689,722 A | 11/1997 | Swarztrauber |
| 5,699,500 A | 12/1997 | Dasgupta |
| 5,758,144 A | 5/1998 | Eberhard et al. |
| 5,838,906 A | 11/1998 | Cheong et al. |
| 5,857,076 A | 1/1999 | Schmidt |

(Continued)

FOREIGN PATENT DOCUMENTS

| | | |
|---|---|---|
| EP | 0107453 A | 5/1984 |
| EP | 0640930 A | 3/1995 |

(Continued)

OTHER PUBLICATIONS

Han et al., "An Efficient Scalable and Flexible Data Transfer Architecture for Multiprocessor SoC with Massive Distributed Memory", DAC 2004, Jun. 7-11, 2004, San Diego, California, USA, pp. 250-255.*

(Continued)

*Primary Examiner* — John M Lindlof
(74) *Attorney, Agent, or Firm* — Lathrop Gage LLP (57) ABSTRACT

A multiprocessor system on a chip (MPSoC) implements parallel processing and include a plurality of cores with inter-core communication. This communication is implemented by an on-chip switch fabric in communication with each core, or by shared memory in communication with each core. In another embodiment, a parallel processing system is implemented as a Howard Cascade and uses shared memory for implementing inter-chip communication. The parallel processing system includes a plurality of chips, each formed as an MPSoC, and implements communication between the chips using shared memory.

8 Claims, 5 Drawing Sheets

(56) References Cited

U.S. PATENT DOCUMENTS

| | | | |
|---|---|---|---|
| 5,860,010 | A | 1/1999 | Attal |
| 5,905,736 | A | 5/1999 | Ronen et al. |
| 6,014,669 | A | 1/2000 | Slaughter et al. |
| 6,117,180 | A | 9/2000 | Dave et al. |
| 6,154,765 | A | 11/2000 | Hart |
| 6,163,855 | A | 12/2000 | Shriivastava et al. |
| 6,167,428 | A | 12/2000 | Ellis |
| 6,295,573 | B1 | 9/2001 | Bailey et al. |
| 6,617,428 | B1 | 9/2003 | Ellis |
| 6,857,004 | B1 | 2/2005 | Howard et al. |
| 7,376,747 | B2 | 5/2008 | Hartop |
| 2001/0011294 | A1 | 8/2001 | Ellis |
| 2002/0010840 | A1* | 1/2002 | Barroso et al. ............... 711/141 |
| 2003/0135614 | A1 | 7/2003 | Hattori et al. |
| 2003/0195938 | A1 | 10/2003 | Howard et al. |
| 2006/0259534 | A1 | 11/2006 | Kimura et al. |
| 2008/0082933 | A1* | 4/2008 | Howard et al. ............... 715/771 |

FOREIGN PATENT DOCUMENTS

| | | |
|---|---|---|
| EP | 0921485 | 6/1999 |
| EP | 1031923 A | 8/2000 |
| EP | 1096378 A2 | 8/2000 |
| WO | WO 94/27216 A | 11/1994 |
| WO | WO 99/19807 A | 4/1999 |
| WO | WO 0101219 | 1/2001 |
| WO | WO2003060748 | 7/2003 |
| WO | WO200511843 A2 | 11/2005 |

OTHER PUBLICATIONS

DeBenedicts, E.P., "Multiprocessor Architectures Are Converging", Hypercube Concurrent Computers and Applications: Proceeding of the third conference on Hypercube concurrent computers and applications: Architecture, software, computer systems, and general issues, vol. 1, pp. 12-20, Pasadena, California, Jan. 19-20, 1988.

Livingston, Marilyn I. and Stout, Quentin F., "Fault Tolerance of the Cyiclic Buddy Subcube Location Sceme in Hypercubes", Proceedings of the 6th Distributed Memory Computing Conference (1991), IEEE, pp. 34-41, 1991.

Fox, G.C., "What Have We Learnt From Using Real Parallel Machines on Real Problems?", Hypercube Concurrent Computers and Applications: Proceedings of the third conference on Hypercube concurrent computers and applications: Architecture, software, computer systems, and general issues, vol. 2, pp. 897-955, Pasadena, California, Jan. 19-20, 1988.

Schwan, K. et al."Topologies—Computational Messaging for Multicomputers", Hypercube Concurrent Computers and Applications: Proceedings of the third conference on Hypercube Concurrent Computers and Applications: Architecture, software, computer systems, and general issues, vol. 1, pp. 580-593, Pasadena, California, Jan. 19-20, 1988.

IBM, "Cluster-Based Stack Optimization Algorithm for Very Large-scale Integration," Sep. 1987, IBM Technical disclosure Bulletin, vol. 30, Issue 4, pp. 1445-1447.

Chong et al., "Concurrent Processing for Picture Archiving and Communicating System (PACS)," Jun. 1995, IEEE, pp. 468-472.

Antaki et al. "The Soft Side of New Enterprise," May 1999, MIT enterprise FORUM of Dallus Network Inc., 2 pages.

Hitachi, "The Next Generation of Information Technology, Hitachi's Got IT!" Spring 97, Hitachi Today No. 39, pp. 1-6 and cover page.

Kahaber, Fujitsu's 2nd Parallel computing WS (PCW'93) Nov. 1993 Kawasaki Japan: Dec. 1993, 15 pages.

Ryan et al., "A Scaleable Distributed Multimedia Knowledge Retrieval System on a cluster of Heterogeneous High Performance Architectures," International Journal on artificial Intelligence tools, vol. 9, No. 3 (2000), pp. 343-367.

"CAD comes on line", Feb. 21, 2000, p. 28, Design News—Automotive.

Hillis, D. " Massive, Parallel Supercomputers—Where They're Going—How They'll Work", Forbes ASAP, Feb. 22, 1999, pp. 60-62 and 64.

"MSC.Software Announces visualNastran 4d2Go; A Total Engineering Solution to be Bundled with CAD Products", Mar. 1, 2000, http://askmerril.com/mlol/main/index.asp?Action=NewsStory &NewsID=1152354.

Keagle, C., et al.: "Categorization and performance analysis of advanced avionics algorithms on parallel processing architectures" IEE, May 22, 1989, pp. 1722-1724.

Trystram D: "Scheduling parallel applications using malleable tasks on clusters" Parallel and Distributed Processing Syposium., Proceedings 15th International San Francisco, CA, USA Apr. 23-27, 2001, Los Alamitos, CA USA, IEE Comput. Soc, 2128-2135.

Chen, et al.: "Parallel 2d delaunay triangulations in hpf and mpi" Parallel and Distributed Processing Symposium, Proceeding 15th International San Francisco, CA, USA Apr. 23-27, 2001, Los Alamitos, CA, USA, IEEE Comput. Soc, 301-308.

Fernandez, E.B., et al: "Fault-tolerant parallel algorithms" Proceedings of Southeaston. Williamsburg, Apr. 7-10, 1991, Proceedings of the Southeast Conference, New York, IEEE, US vol. 1, Apr. 7, 1991, pp. 466-469.

Zhong, X, et al.: "Optimal implantation of parallel divide-and-conquer algoorithms on de Bruijn networks" Frontiers of assively Parallel Computatioh, 1992., Fourth Symposium on the McLean, VA, USA Oct. 19-21, 1992, Los Alamitos, CA, USA, IEEE Comput. Soc, US Oct. 19, 1992, pp. 583-585.

Welch, L.R., et al.: "Metrics and techniques for automatic partitioning and assignment of object-based concurrent programs" Parallel and Distributed Processing, 1995. Proceedings. Seventh IEEE Symposium on San Antonio, TX, USA Oct. 25-28, 1995, Los Alamitos,CA, USA, IEEE Comput. Soc, US, Oct. 25, 1995, pp. 440-447.

Kwan, A.W., et al.: "Using parallel programming paradigms for structuing programs on distributed memory computers" IEE, Apr. 28, 1991, pp. 210-213.

Grundy, J: "Software architecture modelling, analysis an dimplementation with softarch" Proc 34th Hawaii International Conference on System Sciences, Jan. 3, 2001, pp. 3825-3834.

Pontelli, E., et al: "Automatic compile-time parallelization of prolog programs for dependent and-parallelism" Proc. of the Fourteenth International Conference on Logic Programming, [online] Jul. 1997, pp. 108-122, Retrieved From the Internet URL:http://citeseer.ist. psu.edu/cacxhe/papers/cs/16510/http:zSzzSzwww.cs.nmsu. eduzSzguptazSzacezSzstaticdap.pdf/pontelli97automatic.pdf> [retrieved Sep. 1, 2004].

Coddington, P.D., et al: "Web-based access to distributed high-performance geographic information systems for decision support" Proceedings of the Hawaii International Conference on System Sciences, XX, XX, Jan. 5, 1999, pp. 1-12.

"Method Sending Object Agent and Receiving Object Agent" IBM Technical Disclosure Bulletin, IBM Corp. New York, US, vol. 39, No. 12, Dec. 1, 1996, p. 43.

Cameron, I, et al.: "BT Webworld TM-WEB Hosting for Every business Need" British Telecommunications Engineering, British Telecommunications Engineering, London, GB, vol. 16, No. 4, 1998, pp. 273-278.

Saletore, V.A., et al.: "Parallel Computations on the CHARM Heterogeneous Workstation Cluster" High Performance Distributed Computing, 1994, Proceedings of the Third IEEE International symposium on San Francisco, CA, USA Aug. 2-5, 1994, Los Alamitos, CA, USA, IEEE Comput. Soc, Aug. 2, 1994, pp. 203-210.

Desouza-Batista, J.C., et al.: "A Sub-optimal 28 Assignment of Application Tasks Onto Heterogeneous Systems" Heterogenous Computing Workshop, 1994, Proceedings Cancun, Mexico Apr. 26, 1994, Los Alamitos, CA USA, IEEE Comput Soc., 1994, pp. 9-16.

Ross, G.B. et al.: "A Scalable Mutlicomputer" Circuits and Systems, 1993, Proceedings of the 36th Midwest Symposium on Detroit, MI, USA Aug. 16-18, 1993, New York, NY, USA, IEEE, Aug. 16, 1993, pp. 1117-1120.

Chowdhury, A., et al.: "Supporting Dynamic Space-Sharing on Clusters of Non-Dedicated Workstations" Distributed Computing Systems, 1997, Proceedings of the 17th International Conference in (56) References Cited

OTHER PUBLICATIONS

Baltimore, MD, USA May 27-30, 1997, Los Alamitos, CA, USA, IEEE Comput. Soc, US May 27, 1997, pp. 149-158.
Fujitsu's 2nd Parallel Computing WS (PWC'93) Nov. 1993 Kawasaki Japan; Nov. 1993; pp. 1-15.
Carpenter, B. "What is Grid Computing?" Internet Society, Grid Computing ISOC Member Briefing #11, Feb. 26, 2003, pp. 1-4.
U.S. Appl. No. 11/849,050.
Cohen, Ed et al. Efficient Covexity and Domination Algorithms for Fine-and Medium-Grain Hypercube Computers, Algorithmica (1992), vol. 7, pp. 51-75.
Simoneaux, A., "Organizers Hope to Give Lafayette Superstart in High-Tech Direction," 10/27, Supercomputeronline.com, 3 pages published Jan. 30, 2009.

\* cited by examiner

FIG. 8

MULTI-CORE PARALLEL PROCESSING SYSTEM

RELATED APPLICATIONS

This application claims priority to U.S. Patent Application Ser. No. 61/187,999, filed Jun. 17, 2009, which is incorporated herein by reference.

SUMMARY

In an embodiment, a multiprocessor system on a chip (MPSoC) implements parallel processing and includes a plurality of cores, each formed as a system on a chip (SOC), and an on-chip switch fabric in communication with each core to provide inter-core communication.

In another embodiment, a multiprocessor system on a chip (MPSoC) has inter-core communication, and includes a plurality of cores, each formed as a system on a chip (SOC), and a shared memory configured with, for each of the plurality of cores, an input queue.

In another embodiment, a parallel processing system is implemented as a Howard Cascade. The parallel processing system includes a plurality of processor chips, each formed as a multiprocessor system on a chip (MPSoC), and an off-chip switch fabric in communication with each of the processor chips.

In another embodiment, a parallel processing system is implemented as a Howard Cascade and uses shared memory for implementing inter-chip communication. The parallel processing system includes plurality chips, each formed as a multiprocessing system on a chip (MPSoC), and a shared memory configured, for each of the plurality of chips, with an input queue.

DETAILED DESCRIPTION

This disclosure expands use of Howard Cascades, Howard-Lupo Manifolds, and Howard-Lupo Hypermanifolds such as described in U.S. Patent Application Publication Number 2008/0082933 A1 of U.S. patent application Ser. No. 11/849,050 filed Aug. 31, 2007, and incorporated herein by reference.

Figure 1:
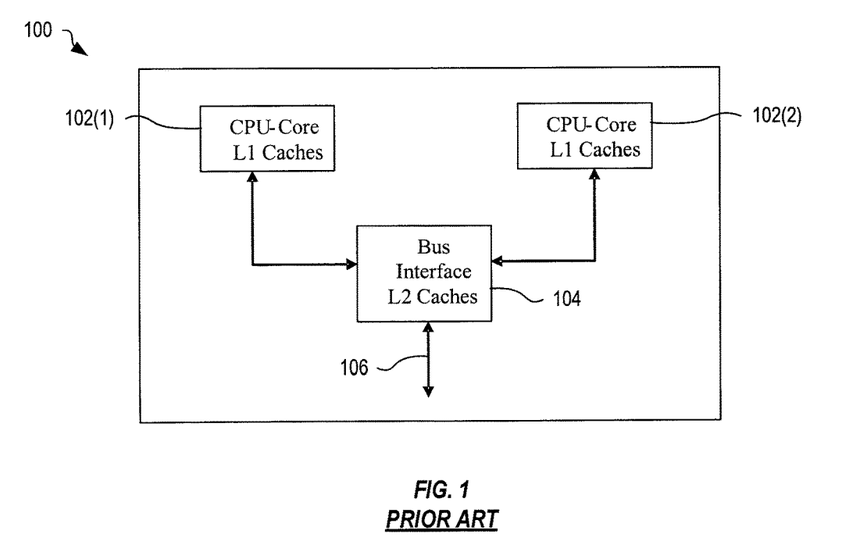
FIG. 1 shows prior art architecture of a dual-core processor where both cores share a level 2 cache and a bus interface.

FIG. 1 shows prior art architecture of a dual-core processor 100 where both cores 102(1) and 102(2) share a level 2 cache and a bus interface 104. Multi-core processor chips include two or more partially independent processor cores that share a common chip interface. Bus interface 104 has a single external memory bus 106 for accessing external memory (not shown).

Figure 2A:
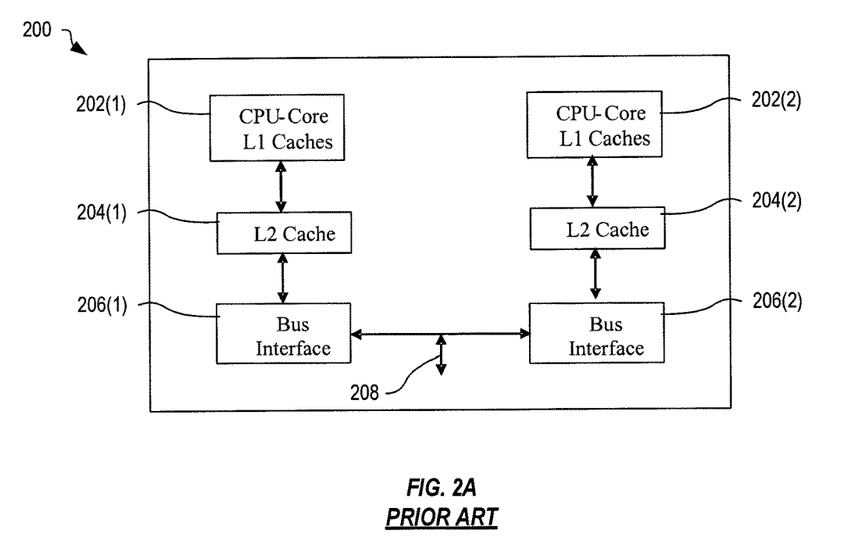
FIG. 2A shows prior art architecture of a dual-core processor where each core has a level 1 cache, a level 2 cache and a bus interface.

FIG. 2A shows prior art architecture of a dual-core processor 200 where each core 202(1), 202(2) has separate level 1 cache and a level 2 cache 204(1), 204(2), and a bus interface 206(1) and 206(2), respectively. Bus interfaces 206 access a single memory bus 208 that interfaces with external memory (not shown).

Figure 2B:
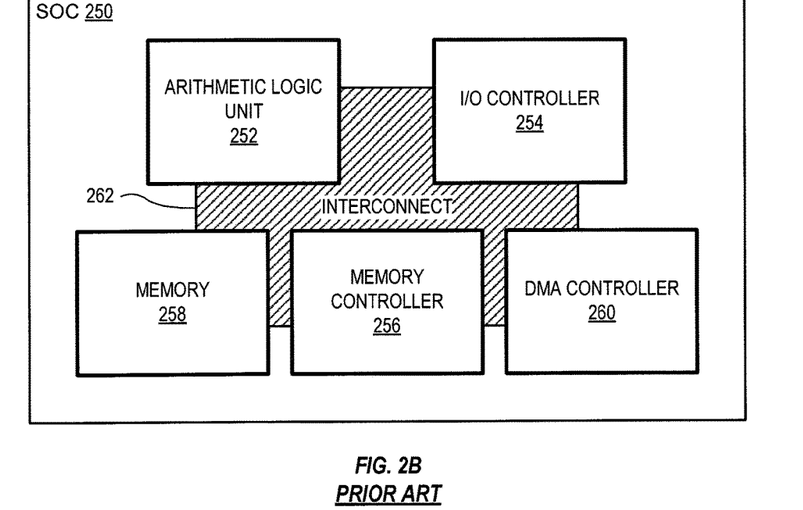
FIG. 2B shows prior art architecture of a 'system on a chip' (SOC).

A System On a Chip (SOC) is a self contained processing system having computer components integrated on to a single chip and may include a microprocessor, memory, a clock generator, IO devices, a DAC, an ADC, and power management circuitry. FIG. 2B shows the architecture of a prior art 'system on a chip' (SOC) 250 that includes an arithmetic logic unit (ALU) 252, an I/O controller 254, a memory controller 256, a random access memory (RAM) 258, and a direct memory access (DMA) controller 260, that are linked together by an on-chip interconnect 262. Interconnect 262 may be implemented within a field-programmable-gate-array (FPGA) type structure to provide interconnectivity of components of SOC 250. A SOC may be utilized to form a node within a Howard Cascade.

Figure 3:
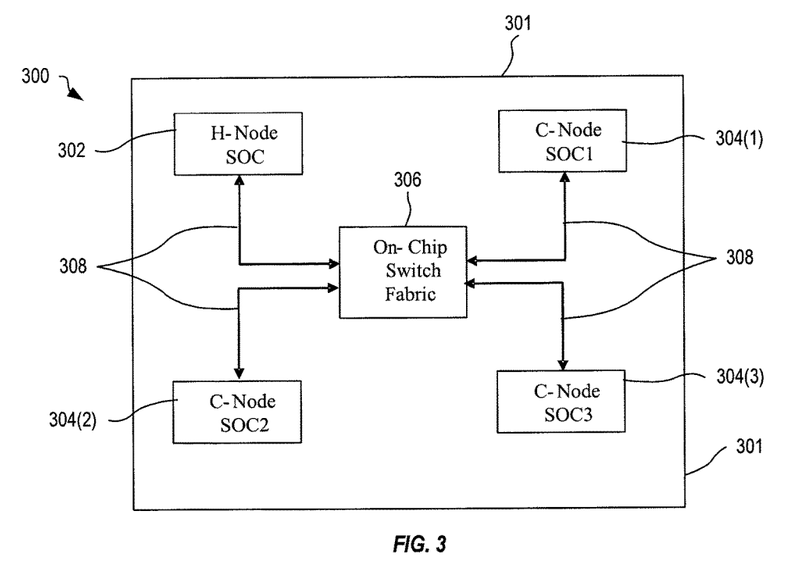
FIG. 3 shows one exemplary multi-core processor 'system on a chip' (MPSoC) with four SOCs interconnecting through an on-chip switch fabric to implement a Howard Cascade, in one embodiment.

FIG. 3 shows one exemplary multi-core processor 'system on a chip', or 'multiprocessor system on a chip' (MPSoC) 301 with four SOCs 302, 304 interconnecting through an on-chip switch fabric 306 to implement a Howard Cascade 300. Each SOC 302, 304 functions as a node in Cascade 360. As shown in FIG. 3, for Howard Cascade 300, SOC 302 represents a home node, and SOCs 304 represent compute nodes. SOCs 302, 304 are shown communicating through on-chip switch fabric 306 using single bi-directional communication channels (indicated by double arrows). Other communication configurations may be used without departing from the scope hereof. For example, each SOC may communicate with another SOC through on-chip switch fabric 306 using two or more bi-directional communication channels.

A switch fabric (also known as switched fabric, switching fabric or simply fabric) is a network topology where network nodes connect with each other via one or more network switches (particularly via crossbar-type switches). The term 'switch fabric' is used in telecommunications, Fibre Channel storage area networks and other high-speed networks, including InfiniBand. By integrating switch fabric 306 onto MPSoC 300, each SOC 302, 304 may connect to, and communicate with, other SOCs through the switch fabric.

Switch fabric 306 provides connectivity between SOCs 302 and 304; channels 308 are communication paths shown for illustrative purposes.

Switch fabric 306 facilitates configuration of SOCs 302, 304 into a Howard Cascade, where SOC 302 represents a home node of the cascade, and SOCs 304(1), 304(2) and 304(3) represent compute nodes of the cascade. SOCs 302 and 304 may be substantially identical, or SOC 302 may have different functionality from SOCs 304, as described in further detail below.

Figure 4:
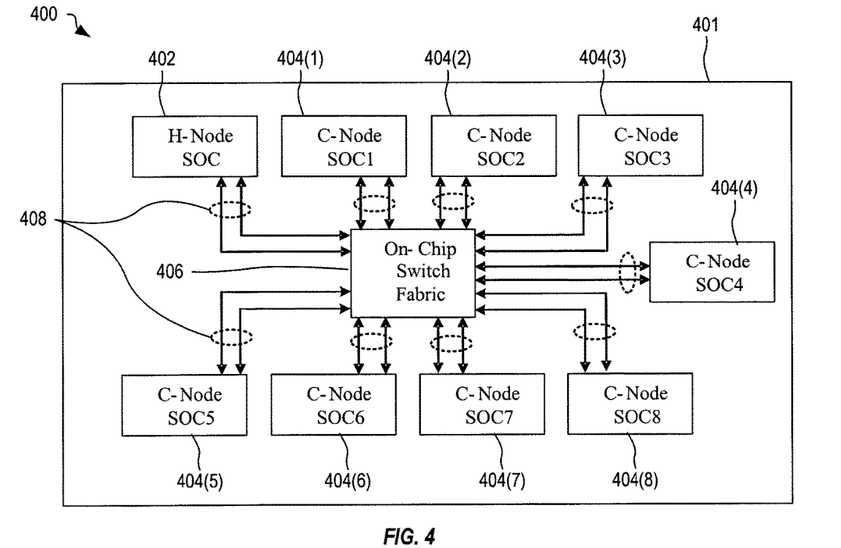
FIG. 4 shows one exemplary MPSoC with nine SOCs having dual-channel interconnectivity through an on-chip switch fabric to implement a Howard Cascade, in one embodiment.

FIG. 4 shows one exemplary MPSoC 400 with nine SOCs [402, 404(1)-404(8)] having dual-channel interconnectivity through an on-chip switch fabric 406 to implement a Howard Cascade 400, in one embodiment. For sake of clarity, duo-channels 408 of FIG. 4 have been shown separately from switch fabric switch fabric 406. Within Howard Cascade 400, SOC 402 represents a home node, similar to SOC 302 of FIG. 3, and SOCs 404 represent compute nodes, similar to SOC 304, except that SOCs 402, 404 are interconnected by dual channels 408. MPSoC 401 may have more or fewer SOCs 402, 404 without departing from the scope hereof. Switch fabric 406 may also provide more or fewer communication channels between each SOC without departing from the scope hereof. The use of two or more communication channels for interconnecting nodes as a Howard Cascade is further described in U.S. patent application Ser. No. 11/849,050.

Figure 5:
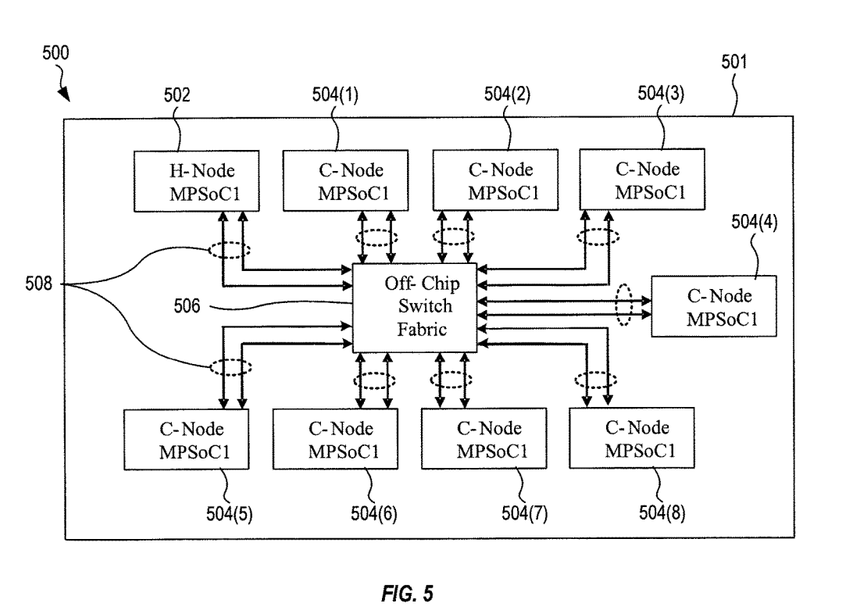
FIG. 5 shows nine MPSoCs having dual-channel interconnectivity through an off-chip switch fabric to form a Howard Cascade, in one embodiment.

FIG. 5 shows nine MPSoCs 502, 504 having dual-channel 508 interconnectivity through an off-chip switch fabric 506 on board 501 to form a Howard Cascade 500. Switch fabric 506 provides dual path connectivity to each MPSoC 502, 504 as shown. As shown, MPSoC 502 represents a home node of Howard Cascade 500, and MPSoCs 504 represent compute nodes of Howard Cascade 500. In one embodiment, MPSoCs 502 and 504 have substantially identical functionality. In an alternative embodiment, MPSoC 502 has different functionality from MPSoC 504. For example, MPSoC 504 may have increased performance in comparison to MPSoC 502 such as a faster CPU and increased memory as to increase compute functionality.

Off-chip switch fabric 506 may support more or fewer communication channels between MPSoCs 502, 504 than shown in FIG. 5, without departing from the scope hereof. The use of two or more communication channels for interconnecting nodes as a Howard Cascade is further described in U.S. application Ser. No. 11/849,050. Howard cascade 500 may have more or fewer MPSoCs 502, 504 without departing from the scope hereof.

In an alternate embodiment, a Manifold is formed on board 501 by a Howard cascade of MPSoC 502, 504 where each MPSoC 502, 504 includes a Howard cascade of two or more SOCs (not shown). A Manifold is a cascade of two or more nodes (e.g., MPSoCs 502, 504), where each of the nodes is includes a cascade of two or more additional nodes (e.g. SOCs 402, 404 of FIG. 4). A Manifold is further described in U.S. application Ser. No. 11/849,050.

Figure 6A:
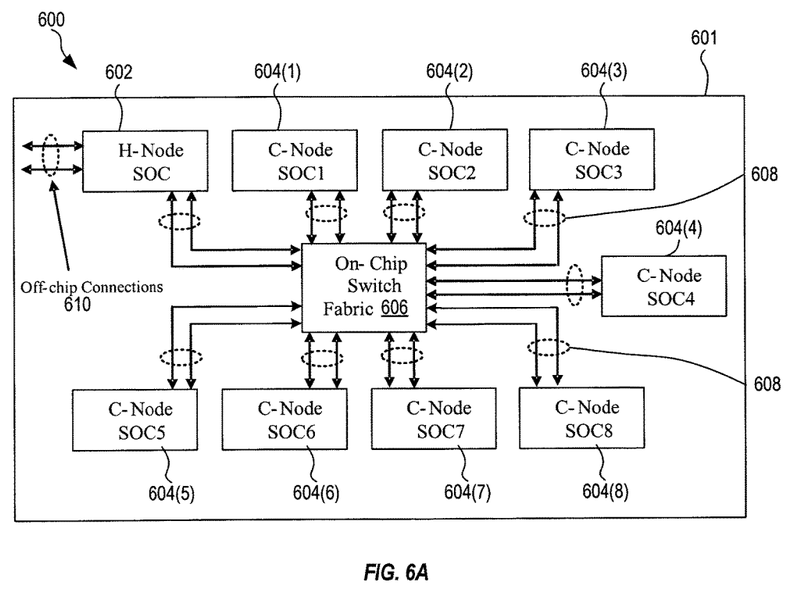
FIG. 6A shows one exemplary MPSoC with nine SOCs having dual-channel interconnectivity through an on-chip switch fabric to implement a Howard Cascade, where one SOC represents a home node with off-chip connectivity, in one embodiment.

FIG. 6A shows one exemplary MPSoC 601 with nine SOCs 602, 604 having dual-channel 608 interconnectivity through an on-chip switch fabric 606 to implement a Howard Cascade 600, where SOC 602 represents a home node with off-chip connectivity. MPSoC 601 may represent one or both of MPSoCs 502 and 504 of FIG. 5. SOCs 602, 604 are similar to SOCs 402, 404 of FIG. 4, on-chip switch fabric 606 is similar to on-chip switch fabric 406, and duo-channels 608 are similar to duo-channels 408. SOC 602, representing the home node, includes additional duo-channel communication path 610 that facilitate off-chip communication for example with an off-chip switch fabric and other off-chip SOCs (not shown). Chip 601 may have more or fewer SOCs 602, 604 without departing from the scope hereof.

Figure 6B:
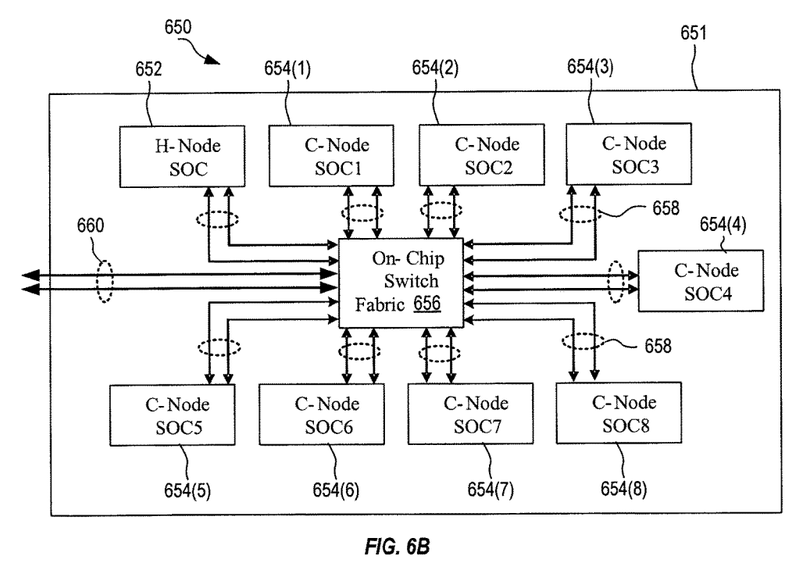
FIG. 6B shows one exemplary MPSoC with nine SOCs interconnected through an on-chip switch fabric to implement a Howard Cascade, where off-chip connectivity is provided by the switch fabric, in one embodiment.

FIG. 6B shows one exemplary MPSoC 651 with nine SOCs 652, 654, having dual-channel 658 interconnectivity through an on-chip switch fabric 656 to implement a Howard Cascade 650, where off-chip connectivity 660 is provided by switch fabric 656. Off-chip connectivity 660 that facilitates communication between MPSoC 651 (i.e., from any of SOCs 602 and 654) and one or more other MPSoCs and/or SOCs (not shown). Multicore chip 651 may represent MPSoC 502 and/or 504 of FIG. 5. SOCs 652, 654 are similar to SOCs 402, 404, FIG. 4, on-chip switch fabric 656 is similar to on-chip switch fabric 406 and duo-channels 658 are similar to duo-channels 408, FIG. 4. MPSoC 651 may have more or fewer SOCs 652, 654 without departing from the scope hereof.

Figure 7:
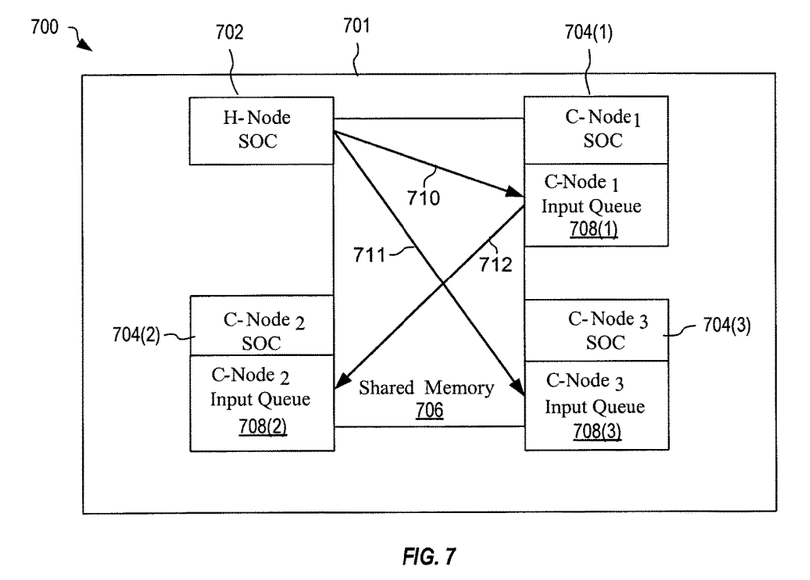
FIG. 7 is a schematic diagram showing exemplary communication through shared memory between four SOCs of a multi-core processor chip configured as a Howard Cascade.

FIG. 7 is a schematic drawing showing exemplary communication through shared memory 706 between a home node SOC 702 and three compute nodes SOCs 704(1)-704(3) of a Howard Cascade 700 implemented on MPSoC 701. MPSoC 701 may represent one or both of dual-core processor 100, 200 of FIGS. 1 and 2A, respectively. Each SOC 702, 704 may include its own (non-shared) memory (e.g. cache) and may access shared memory 706 (e.g. external RAM) via a shared memory bus (not shown).

Figure 8:
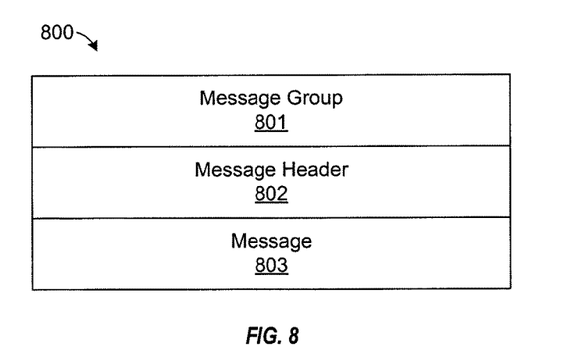
FIG. 8 is a diagram of an exemplary inter-nodal message.

Although the use of shared memory messages and shared memory message queues is well understood, the use of a Howard Cascade as part of a coordinated transmission of information through multiple SOCs is novel. Typically shared memory message queues are accessed as a simple pair connection between computational components. However, in the present system, the access of multiple memory sections is coordinated, decreasing total memory access time. FIG. 8 is a diagram of an exemplary inter-nodal message 800. For the coordinated transmission to take place, each message 800 exchanged between nodes has three parts—message group 801, message header 802, and message 803, as shown in FIG. 8. The message group 801 identifies which computational devices are part of the exchange, the message header 802 identifies the structure of the message, and the message 803 is the message data itself.

In an exemplary embodiment, as shown in FIG. 7, home node 702 places the list of computational devices (in message group 801), plus the message header 802 and the message 803, into the input queue 708(1) of the first SOC 704(1), as indicated by arrow 710. The home node 702 then repeats this for the input queue 708(3) for the third SOC 704(3) [arrow 711], while simultaneously the first SOC 704(1) places the list of computational devices 801, plus the message header 802 and the message 803, into the input queue 708(2) of the second SOC 704(2) [arrow 712]. Since the input queues are first-in/first-out (FIFO) queues, and furthermore, since all communication is coordinated, there is no need for typical memory locking/unlocking methods. All communication through a particular group of SOCs is coordinated (using a Howard Cascade in a tree broadcast all-to-all exchange), therefore no blocking ever occurs. Unlike other shared memory message queue systems there is no output queue.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A multiprocessor system on a chip (MPSoC) for implementing parallel processing comprising:
    a plurality of cores, each comprising a system on a chip, wherein each of the cores functions as a node in a parallel processing system operating as a structured cascade; and
    an on-chip switch fabric directly connected to each of the cores;
    wherein the on-chip switch fabric is configurable for coordinated simultaneous direct communication between multiple pairs of the cores to form the structured cascade based upon position of each of the plurality of cores within the structured cascade, wherein, for each direct communication, data transfer from/to each core of the pair is directly coupled in time.

2. The MPSoC of claim 1, wherein one of the nodes is a home node and a plurality of the remaining nodes are compute nodes of the structured cascade.

3. The MPSoC of claim 1, wherein inter-core communication is provided by a bidirectional communication channel between each intercommunicating node.

4. The MPSoC of claim 1, further comprising at least one off-chip communication channel for communicating with an off-chip switch fabric.

5. A parallel processing system implemented as a structured cascade, comprising:
    a plurality of processor chips, each comprising a multiprocessor system on a chip having a plurality of systems on a chip (SOCs), where each SOC is directly coupled to an on-chip switch fabric of the multiprocessor system on a chip; and
    an off-chip switch fabric communicatively coupled directly to each of the on-chip switch fabrics of the plurality of processor chips for enabling simultaneous directly coupled communication between multiple independent pairs of the plurality of SOCs of different ones of the processor chips;
    wherein, for each directly coupled communication, data transfer from/to each SOC of the pair is directly coupled in time.

6. The parallel processing system of claim 5, wherein the on-chip switch fabrics and the off-chip switch fabric are collectively configurable to communicatively couple each of the plurality of SOCs to form the structured cascade.

7. The parallel processing system of claim 5, wherein the off-chip switch fabric provides one or more bi-directional communication channels between pairs of the SOCs of different ones of the processor chips.

8. The parallel processing system of claim 5, wherein the on-chip switch fabric provides one or more bi-directional communication channels between pairs of the SOCs.

* * * * *